United States Patent
Pucci (10) Patent No.: US 10,684,819 B2
(45) Date of Patent: *Jun. 16, 2020

(54) SYSTEMS AND METHODS FOR CONTROLLING A MODULAR SPEAKER SYSTEM

(71) Applicant: Bose Corporation, Framingham, MA (US)

(72) Inventor: Lino Antony Pucci, Wellesley Hills, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/389,267

(22) Filed: Apr. 19, 2019

(65) Prior Publication Data
US 2019/0243605 A1    Aug. 8, 2019

Related U.S. Application Data

(63) Continuation of application No. 15/256,246, filed on Sep. 2, 2016, now Pat. No. 10,310,803.

(51) Int. Cl.
| | | |
|---|---|---|
| *G06F 3/16* | (2006.01) | |
| *H04R 5/04* | (2006.01) | |
| *H04R 3/12* | (2006.01) | |
| *H04R 3/00* | (2006.01) | |

(52) U.S. Cl.
CPC .............. *G06F 3/165* (2013.01); *H04R 3/12* (2013.01); *H04R 5/04* (2013.01); *H04R 3/002* (2013.01); *H04R 2227/003* (2013.01); *H04R 2420/03* (2013.01); *H04R 2420/07* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,581,626 A | * | 12/1996 | Palmer ..................... | H03G 5/00 381/103 |
| 5,910,991 A | * | 6/1999 | Farrar ..................... | G06F 3/165 381/120 |
| 6,201,537 B1 | * | 3/2001 | Yoon ..................... | H03G 3/3021 345/14 |
| 6,385,322 B1 | * | 5/2002 | Mietling ................. | H04R 3/04 381/59 |

(Continued)

FOREIGN PATENT DOCUMENTS

CN    203896492 U    10/2014

OTHER PUBLICATIONS

Invitation to Pay Additional Fees in PCT/US2017/045416, mailed on Sep. 21, 2017; 14 pages.

(Continued)

*Primary Examiner* — Akelaw Teshale
(74) *Attorney, Agent, or Firm* — Schmeiser, Olsen & Watts LLP; Timothy P. Collins (57) ABSTRACT

A modular speaker system comprises a first speaker module; at least one second speaker module in communication with the first speaker module; and a controller that receives an instruction to selectively activate, reactivate, or inactivate the at least one second speaker module with respect to the first speaker module.

18 Claims, 4 Drawing Sheets

(56) References Cited

U.S. PATENT DOCUMENTS

| | | | |
|---|---|---|---|
| 6,920,224 B2* | 7/2005 | Oki | H03G 5/00 381/123 |
| 6,934,394 B1* | 8/2005 | Anderson | H04R 5/04 381/19 |
| 7,433,483 B2* | 10/2008 | Fincham | H04S 1/002 381/337 |
| 8,272,804 B2 | 9/2012 | Huang et al. | |
| 2012/0096125 A1* | 4/2012 | Kallai | H03G 5/005 709/219 |
| 2013/0022221 A1 | 1/2013 | Kallai et al. | |
| 2013/0028443 A1 | 1/2013 | Pance et al. | |
| 2013/0156209 A1* | 6/2013 | Visser | H04M 1/20 381/66 |
| 2013/0163783 A1 | 6/2013 | Burlingame | |
| 2013/0177186 A1* | 7/2013 | Schul | H02J 50/20 381/300 |
| 2013/0177198 A1* | 7/2013 | Hogue | H04R 5/04 381/394 |
| 2013/0305152 A1* | 11/2013 | Griffiths | G06F 3/04883 715/716 |
| 2014/0064492 A1* | 3/2014 | Lakkundi | G06F 3/165 381/17 |
| 2015/0065113 A1* | 3/2015 | Liu | H04W 52/0254 455/418 |
| 2015/0098590 A1* | 4/2015 | Oswell | H04R 3/04 381/120 |
| 2015/0189438 A1* | 7/2015 | Hampiholi | G06F 3/165 381/80 |
| 2015/0237454 A1 | 8/2015 | Scheirer et al. | |
| 2015/0256954 A1 | 9/2015 | Carlsson et al. | |
| 2015/0264509 A1 | 9/2015 | Oishi et al. | |
| 2016/0012827 A1 | 1/2016 | Alves et al. | |
| 2016/0066093 A1 | 3/2016 | Fisher et al. | |
| 2016/0163303 A1* | 6/2016 | Benattar | G10K 11/17837 381/71.11 |
| 2016/0309269 A1 | 10/2016 | Peters et al. | |
| 2017/0034621 A1* | 2/2017 | Garner | H04R 3/04 |
| 2017/0171686 A1* | 6/2017 | Hsieh | G06K 9/00758 |

OTHER PUBLICATIONS

International Search Report & Written Opinion in PCT/US17/45416, dated Dec. 21, 2017; 27 pages.
Non-Final Office Action in U.S. Appl. No. 15/256,246 dated Jul. 26, 2017; 11 pages.
Notice of Allowance in U.S. Appl. No. 15/256,246 dated Jan. 26, 2018; 8 pages.
Non-Final Office Action in U.S. Appl. No. 15/256,246 dated Jun. 29, 2018; 14 pages.
Notice of Allowance in U.S. Appl. No. 15/256,246 dated Feb. 19, 2019; 9 pages.
International Preliminary Report on Patentability in PCT/US2017/045416 dated Mar. 14, 2019; 18 pages.

* cited by examiner

SYSTEMS AND METHODS FOR CONTROLLING A MODULAR SPEAKER SYSTEM

RELATED APPLICATIONS

This application is a continuation application that claims the benefit of U.S. patent application Ser. No. 15/256,246, filed on Sep. 2, 2016 and entitled "Systems and Methods for Controlling a Modular Speaker System," the content of which is incorporated by reference in its entirety. This application is related to pending U.S. patent application Ser. No. 14/184,989, filed on Feb. 20, 2014, entitled "Content-Aware Audio Modes," the content of which is incorporated by reference in its entirety.

BACKGROUND

This description relates generally to audio systems, and more specifically, to a sound bar assembly comprising a set of modules that can be independently controlled, for example, activated or inactivated.

BRIEF SUMMARY

In accordance with one aspect, a modular speaker system comprises a first speaker module; at least one second speaker module in communication with the first speaker module; and a controller that receives an instruction to selectively activate, reactivate, or inactivate the at least one second speaker module with respect to the first speaker module.

Aspects may include one or more of the following features:

The first speaker module and the at least one second speaker module may be constructed and arranged to receive audio signals from a multimedia electronic display or monitor.

The at least one second speaker module may include at least one of a bass module or a surround sound module.

When the bass module is activated, the first speaker module may not reproduce low frequency tones.

The first speaker module may generate and output a first range of sounds according to an audio output profile when the at least one second speaker module is activated, and the first speaker module may generate and output a second range of sounds according to a different audio output profile when the at least one second speaker module is inactivated.

The audio output profile may correspond to both the first speaker module and the at least one second speaker module, and the different audio profile may correspond to the first speaker module alone.

The modular speaker system may further comprise an application stored and executed at a customer electronic device. The application may perform a user-selectable night time mode operation which generates and outputs a control signal that includes the instruction to at least one of activate, reactivate, or inactivate the at least one second module.

In accordance with another aspect, a sound bar assembly comprises a first sound box that generates and outputs a first range of sounds according to a first audio output profile; at least one second sound box in communication with the first sound box, the at least one second sound box that generates and outputs a second range of sounds that complements the first range of sounds; and a controller that receives and processes an instruction from a remote electronic device to inactivate or reactivate the second box, wherein in response the first sound box generates and outputs a first range of sounds according to second audio output profile.

Aspects may include one or more of the following features:

The first sound box and the at least one second sound box may be constructed and arranged to receive audio signals from a multimedia electronic display or monitor.

The least one second sound box may include at least one of a bass speaker or surround sound speakers.

When the bass speaker is activated, the first sound box may not reproduce low frequency tones.

The first audio output profile may correspond to both the first sound box and the at least one second sound box, and the second audio output profile may correspond to the first sound box alone.

A system tuning parameter of the assembly may be changed when the at least one second sound box is shut off or inactivated.

The sound bar assembly may wirelessly communicate with a customer electronic device, the customer electronic device performing a user-selectable night time mode operation which generates and outputs a control signal that includes the instruction to at least one of activate, reactivate, or inactivate the at least one second box.

In accordance with another aspect, an audio system for a home theater entertainment system, comprises a sound bar module; at least one of a bass module or a surround sound module; and an application that generates and outputs a control signal that includes the instruction to activate, reactivate, or inactivate the at least one of the bass module or the surround sound module with respect to the sound bar.

Aspects may include one or more of the following features:

The application may be executed at a remote mobile electronic device.

The audio system may further comprises an audio output profile stored and executed at one or more of the sound bar module, bass module, and surround sound module, the audio output profile controlling an audio output of the one or more of the sound bar module, bass module, and surround sound module.

The sound bar module and the at least one of a bass module or the surround sound module may output a first range of sounds according to the audio output profile when the at least one of a bass module or the surround sound module is activated, and the sound bar module may generate and output a second range of sounds according to a different audio output profile when the at least one of a bass module or the surround sound module is inactivated.

The application may perform a user-selectable night time mode operation which generates and outputs a control signal that includes the instruction to at least one of activate, reactivate, or inactivate the at least one of a bass module or the surround sound module.

The night time mode operation may be performed to activate or inactivate according to a type of program content.

BRIEF DESCRIPTION

The above and further advantages of examples of the present inventive concepts may be better understood by referring to the following description in conjunction with the accompanying drawings, in which like numerals indicate like structural elements and features in various figures. The drawings are not necessarily to scale, emphasis instead being placed upon illustrating the principles of features and implementations.

DETAILED DESCRIPTION

Modern entertainment systems, for example, home theater systems or television sets, typically provide a multimedia environment including at least a display screen and a digital audio system. A well-known audio system may include a sound bar, which includes a speaker enclosure positioned under the display screen.

Figure 1:
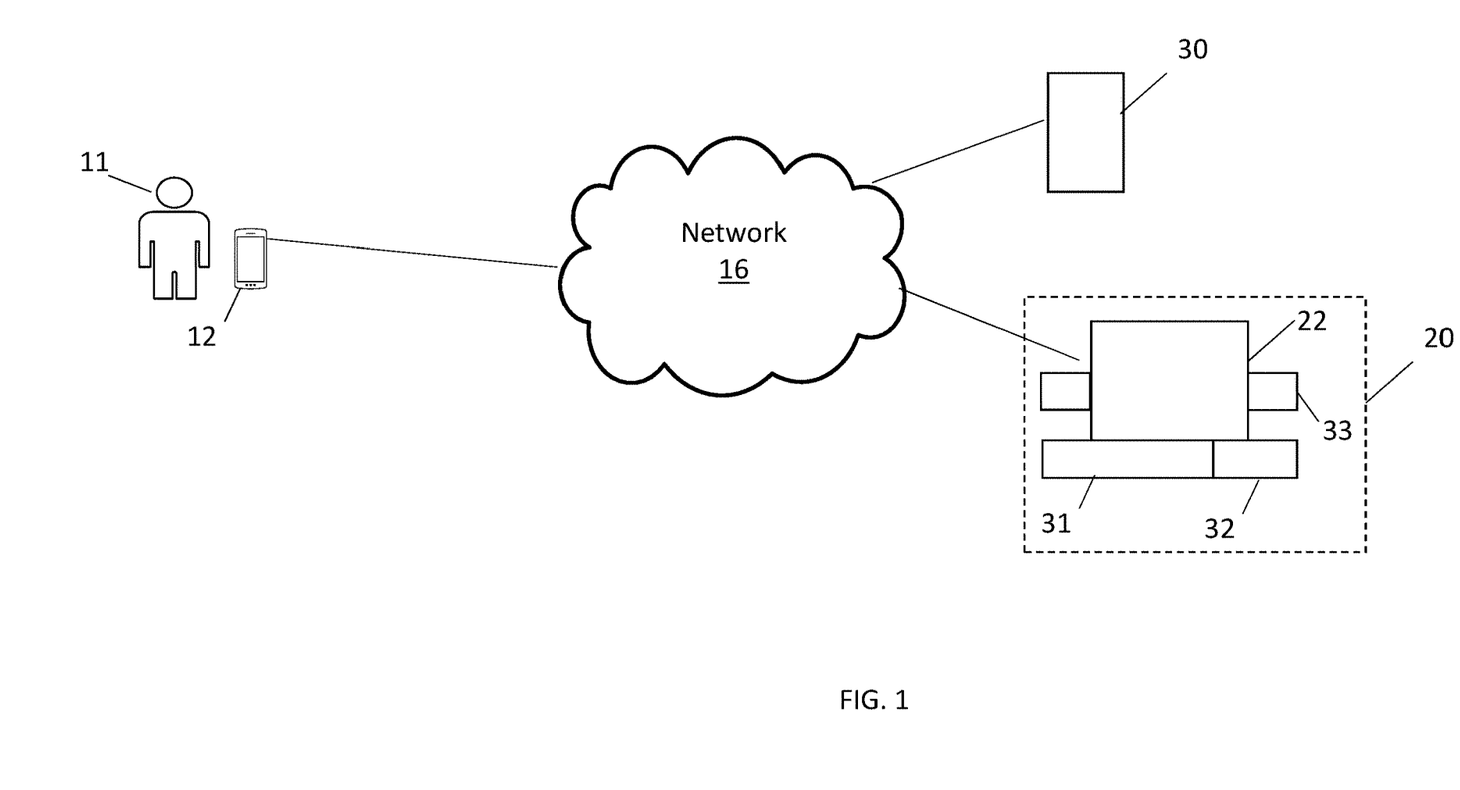
FIG. 1 is a network diagram illustrating an environment in which examples of a modular speaker system are practiced.

As shown in FIG. 1, a multimedia environment 20 may include a display such as a television (TV) 22 and a modular speaker system comprising a sound bar module 31, a bass module 32, and at least one surround sound module 33 (generally referred to as "modules). Although a TV 22 is referred to, any electronic display or monitor may equally apply, such as a liquid crystal display (LCD) and so on. The speaker system may be housed in one or more enclosures configured for having a size and appearance that match or otherwise complement the TV 22, or a TV cabinet, for purposes of efficiency, space savings, and/or aesthetic appearance. The speaker system is constructed and arranged to communicate with the TV 22, for example, via a wired connection, for example, to receive, process, and output audio from the TV 22.

The multimedia environment 20 may interface with a network 16 for communicating with a remote electronic device 12, for example, a user computer, tablet or phone, a data repository, or storage device 30, such as a set-top box, for example, for accessing a satellite dish, cable network, fiber outlet, and so on, and/or other electronic devices, video and/or audio storage devices, computer servers, routers, switches, and so on. The network may include a local network, such as a Wi-Fi, wired Ethernet, or the like, and/or long distance network such as the internet, cloud, global positioning satellite (GPS), and/or other network that provides for the exchange of electrical signals between various computing devices for establishing electronic communications therebetween.

Figure 2:
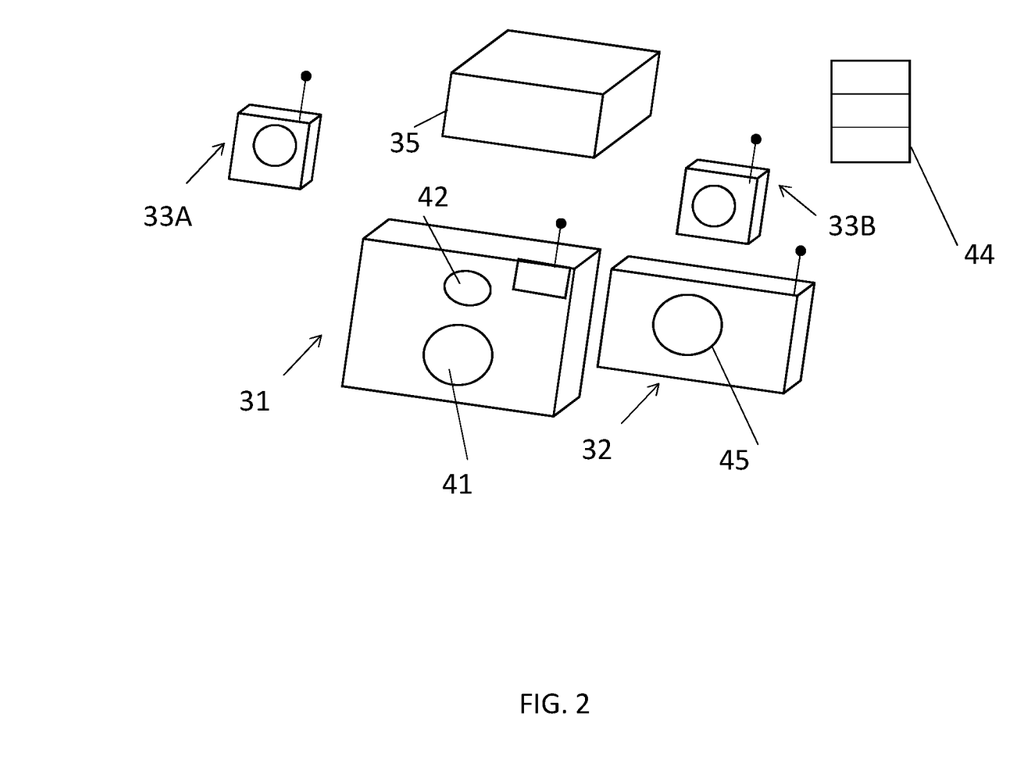
FIG. 2 is a perspective view of a modular speaker system, in accordance with some examples.

The sound bar module 31, bass module 32, and surround sound modules 33A, 33B (collectively 33) may each be a separate enclosure as shown in FIG. 2, and can communicate with each other via a wireless communication protocol or the like, for providing connections, and for exchanging, combining, or otherwise providing audio-related signals between the various modular elements of the multimedia environment 20. Alternatively, the sound bar module 31, bass module 32, and surround sound modules 33 may be part of a same enclosure.

The sound bar module 31 may be constructed and arranged for positioning near a display device e.g. above a computer monitor or under a television or home theater screen. The sound bar module 31 may include a plurality of transducers, for example, four of the oval "racetrack" transducers, tweeters, for example, three round tweeters and a plurality of phase guides, for example, two phase guides. The sound bar module 31 may also include one or more printed circuit boards (PCBs) that include digital signal processors (DSPs), audio decoders (e.g., Dolby TrueHD®, Dedicated To Sound (DTS), or uncompressed multichannel PCM audio codecs), an infrared sensor or the like, amplifiers, and other elements for performing a full range of sound. The sound bar module 31 may include one or more different connectors or ports, such as Wi-Fi, Bluetooth, NFC, HDMI connectors, for example, HDMI-CEC and HDMI-ARC, 4K pass-through connectors, or any combination thereof. The sound bar module 31 includes an enclosure for housing one or more speakers, for example, one or more midrange speakers 41 and/or tweeters 42. The sound bar module 31 may also include audio-processing devices for receiving and processing audio signals, for example, from another element of a home theater system, and outputting sound that is preferably desired by a user.

The sound bar module 31 may be connected to the television (TV) 22, set top box, receiver, and/or related electronic device via wired connectors for receiving audio signals. The sound bar module 31 may include an amplifier board, which converts a TV signal into an audio signal for processing and output to the respective speakers in the modular speaker system.

The sound bar module 31 may include a controller 35 that processes various exchanges between components of the multimedia environment 20 (FIG. 1), for example, exchanges signals between a remote electronic device 12 (FIG. 1) and the sound bar module 31 and one or more other modules, for example, the bass module 32, and surround sound modules 33. In another example, the controller 35 receives an instruction to selectively activate or inactivate other modules with respect to the sound bar module 31. The controller 35 may be in the same enclosure as the other sound bar components, or as shown in FIG. 2 may be in a separate enclosure and communicate with a processor in the sound bar module 31 via a wireless communication. As described herein, the controller 35 can facilitate the inactivation of the bass module 32 and/or surround sound modules 33 in response to a user 11 (FIG. 1) submitting a request received by the remote electronic device 12, which may be for example, the user's mobile electronic device such as a smartphone, computer tablet, or electronic notebook, or via a computer running the same application as the mobile device, to change the configuration of the modular speaker system, for example, to selectively turn off the surround sound modules 33 when for example, a movie is not being displayed on the TV 22 of the multimedia environment 20.

The remote electronic device 12 may include a processor that executes an application to generate and output a control signal that activates, reactivates, and/or inactivates the various modules relative to each other. The control signal may be received by the controller 35, which in turn identifies a profile to be executed based on the control signal.

The remote electronic device 12 and the executed application may provide inputs to the sound bar module 31. The application may provide a user interface on a device display, for example, illustrated at FIGS. 4A-4B, so that a user can adjust settings. For example, a speaker selection item may be displayed when there is at least one wireless speaker connected. Here, setting options may include "all on," "all off," "bass module off," "surround speakers off," and so on. Here, a user may provide instructions which are processed for temporarily disabling speakers identified in the selection, for example, disabling a bass speaker in the bass module 32. In this example, the bass module 32 may be turned on automatically upon a subsequent power recycling of the system. When the bass module 32 is activated, the sound bar module 31 does not reproduce low frequency tones since these tones are to be provided by the activated bass module 32.

Figure 4A:
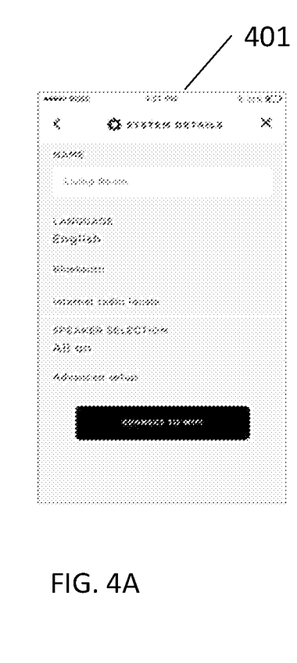
FIGS. 4A-4B are screenshots of a user interface that performs one or more steps of the method of FIG. 3.
Figure 4B:
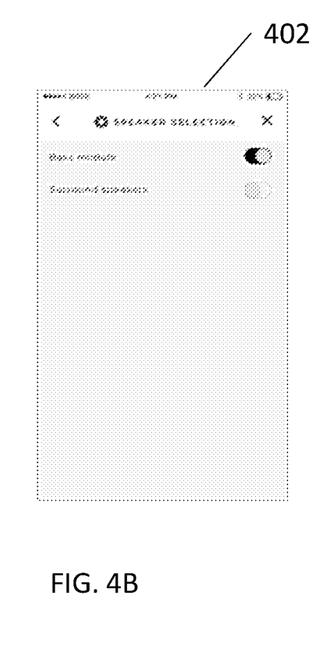

The user interface may display a communication interface screen, permitting audio to be played directly from an HDMI-IN source or other user-identified audio source, for example, where a television is configured to play a lower audio quality.

In some examples, a mode may remain active for as long as the system is powered on. When the system is powered off, the new power cycle will revert to a normal or default operation. For example, the sound bar 35 may be configured to execute a default profile which may occur during a particular listening session by a user. When the system is turned off, the system may revert to an original state for a subsequent power activation, for example, to a default audio output profile.

The bass module 32 can augment a bass sound level provided by the sound bar module 31. As shown in FIG. 2, the bass unit 32 may include one or more bass speakers 45, e.g., sub-woofers, that reproduce and output low frequency components of an audio signal. A light emitting diode (LED) or the like may provide a connection status, for example, indicating when a connection is made or lost between the sound bar 31 and/or other speakers such as surround speaker modules 33.

The surround sound modules 33 are constructed and arranged to receive and amplify surround sound channel signals transmitted by the sound bar module 31 or the bass module 32. The surround sound modules 33 may be separate from the sound bar module 31, for example, positioned at different locations of a room for improving or optimizing a listener's audio experience.

Each of, or a combination of, the sound bar module 31, bass module 32, and surround sound module 33 can have at least one audio output profile 44. In some examples, the profiles 44 of all modules may be stored at the sound bar module 31. In other examples, audio output profiles 44 may be stored in a memory device at each module 31, 32, 33 in the modular speaker system. In other examples, audio output profiles 44 may be stored at a remote location, for example, at a cloud computer 30 (FIG. 1), a storage device on the internet or local Wi-Fi network 16, or a user's electronic device 12.

The audio output profile 44 can include configuration details for the speakers of one or more of the respective module 31, 32, 33, such as type of speaker, e.g., tweeter, midrange, woofer, for example, frequency range, equalizers, and gains to optimize the sound output based on the audio being processed. In other examples, the sound bar module 31, bass module 32, and surround sound module 33 may each have a default configuration profile, for example, including parameters set at the time of manufacturing or at the retail store where the module is purchased.

The audio output profile 44, or profiles, when activated may control the audio output of the speakers of the modules 31, 32, 33. In some examples, when the profile is selected to control the audio of the sound bar module 31, the parameters are activated and cause an audio signal to be processed accordingly. For example, a system tuning parameter such as an equalization (EQ) of the module speaker system may be changed when a single module is shut off or otherwise inactivated. Other system tuning parameters such as a bass tone control, limiters, and so on may be changed according to a selected speaker configuration. In other examples, if the bass module 32 is inadvertently unplugged or otherwise disconnected or powered down, then the sound bar module 31 will preserve configured tuning parameters such as equalization features, i.e., no automatic switching of equalization or the like.

In some examples, the sound bar module 31 may have different audio output profiles 44, depending on whether the sound bar module 31 is in communication with the bass module 32 and/or surround sound module 33. For example, the sound bar module 31 may have a first audio output profile, or default profile, that is activated when a determination is made that the sound bar module 31 is a standalone device, whereby the first audio output profile has a different profile for bass, surround sound, or other parameters. When a determination is made that that the sound bar module 31 is in communication with the bass module 32 and/or surround sound module 33, a different audio output profile may be activated to compensates for the presence of the bass module 32 and/or surround sound module 33.

A user may associate, bond, or otherwise pair another module such as a surround sound module 33 to the sound bar module 31. The sound bar module 31 then establishes that it has a "mate." Once paired, the sound bar module 31 establishes that it must search for the other components upon startup. If the sound bar module 31 doesn't find one or both of the mating participant modules, it will automatically revert back to a "standalone" mode, i.e., only the sound bar module 31. This can also occur when the user decides to turn off the subwoofer and/or surround speakers via the application executed by the remote electronic device 12.

Figure 3:
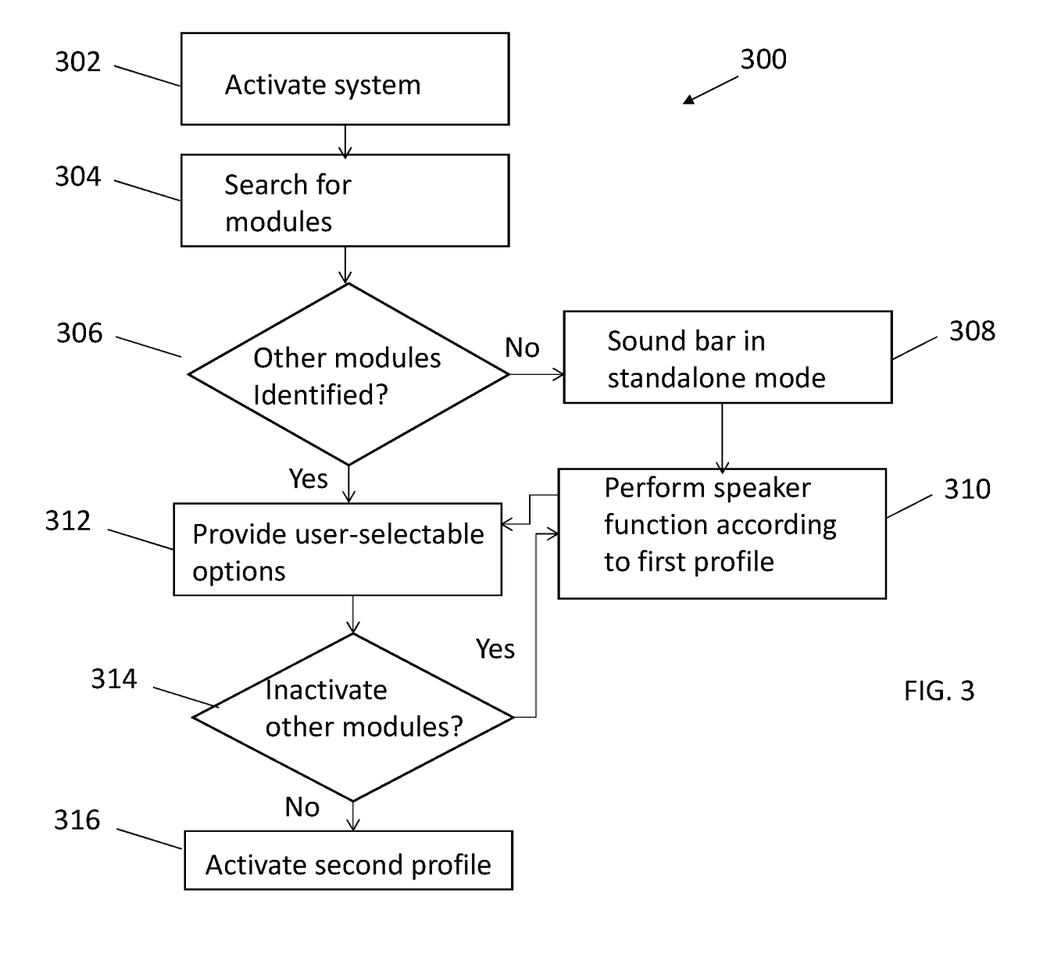
FIG. 3 is a flow diagram of a method for controlling a modular speaker system, in accordance with some examples.

FIG. 3 is a flow diagram of a method 300 for controlling a modular speaker system, in accordance with some examples. In describing the method 300, reference may be made to elements of FIGS. 1 and 2.

At block 302, the modular speaker system is activated, or powered up.

At block 304, the sound bar module 31 searches for other modules, for example, the bass module 32 and surround sound modules 33.

At decision diamond 306, a determination is made whether other modules are available for communicating with the sound bar module 31. For example, the sound bar module 31 after powerup may search for other products to which it was previously bonded.

If a determination is made that no other modules are available, then the method 300 proceeds to block 308 where the sound bar module 31 is placed in a standalone mode. At block 310, the sound bar module 31 operates in a standalone environment according to predetermined configuration details established by a first profile that is activated at block 302. The first profile, or default profile, may include parameters that establish a full range of sounds.

If at decision diamond 306 a determination is made that other modules are available, then the method 300 proceeds to block 312 where a user may receive a user-selectable option at a computer display such as remote electronic device 12.

At decision diamond 314, the user selects an option whether to inactivate the other available modules. The other modules, e.g., bass module 32 and/or surround sound modules 33, may each have a profile stored in memory, that may be provided to the sound bar module 31 when the other modules operate in concert with the sound bar module 31. Alternatively, the sound bar module 31 may include several profiles, including the abovementioned first profile or default profile that is activated when no other modules are in communication with the sound bar module 31. The other profiles may be activated when the bass module 32 and/or surround sound modules 33 are in communication with the sound bar module 31.

If at decision diamond 314 a determination is made that a selection is made to inactivate the other modules, then the method 300 may proceed to block 310 where a night time mode is activated, and the sound bar module 31 performs according to the first, or default profile which corresponds to only the sound bar module 31. The night time mode may be generated from an application executed at the remote mobile electronic device 12, or a processor at the sound bar module 31, or other electronic device.

In some examples, an audio output profile 44 stored at one or more modules 31, 32, 33 in the modular speaker system may be automatically selected based upon the time of day. For example, a night time mode may be configured to activate between user-defined periods of time, such as between 10:00 PM and 6:00 AM on weekdays. In other examples, a night time mode may be configured to activate according to a type of program content, for example, news or documentaries, but to deactivate for another type of program content, such as movies and sports. The night time mode may be configured to activate according to other user-selectable criteria, and is not limited to the foregoing examples.

If at decision diamond 314 a determination is made that a selection is made to activate another module in communication with the sound bar module 31, for example, activate the bass module 32 and/or surround sound modules 33, the method 300 proceeds to block 316, where a second profile of the other profiles is activated. The second profile may be provided by the other module, or may be stored at the sound bar module 31. In other examples, the profiles may be stored at a separate device, for example, stored in a cloud, on a user device, or a database, for example.

Returning to block 310, the method 300 may proceed from block 310 to block 312 if the user decides to inactivate the night time mode, and to reestablish communication between the sound bar module 31 and the other modules in communication with the sound bar module 31. At decision diamond 314, the user may elect to activate the other modules. At block 316, a second profile may be activated that includes a combination of speakers of the sound bar module 31 and the other selected modules.

In some examples, the sound bar 31 may operate in concert with the bass module 32 and/or surround sound modules 33, but a connection may be broken, for example, due to a loss of power or malfunction of the bass module 32 and/or surround sound modules 33. Here, the sound bar module 31 may be configured to automatically revert to the first profile, or default profile, when the sound bar module 31, or the controller 35, discovers the broken connection. The sound bar module 31 may automatically activate or reactivate the second profile, for example, the profile including features of a combination of the sound bar module 31 and the disconnected other module, when the sound bar module 31 is reconnected with the other module.

As described above, the method 300 may be performed in a home theater environment. However, other applications may equally apply. For example, the method 300 may be performed at a retail establishment where a store clerk may perform some or all of the method 300 for a store customer. Here, the store customer may wish to hear various sound configurations to assist with a shopping decision whether to purchase the sound bar module 31 alone, or to purchase the sound bar module 31 with the bass module 32 and/or surround sound modules 33.

FIGS. 4A and 4B are various screenshots of a user interface that performs one or more steps of the method of FIG. 3. The user interface may be displayed at a customer electronic device 12 shown and described at FIG. 1.

The user interface screen 401 shown in FIG. 4A displays user-adjustable configuration system details related to a modular speaker system, for example, a speaker system comprising a sound bar module 31, a bass module 32, and at least one surround sound module 33 shown in FIGS. 1 and 2.

The user interface screen 402 shown in FIG. 4B includes speaker selection details with respect to a system detail, namely, a speaker selection, illustrated in FIG. 4A. Here, a user can select whether to temporarily activate, reactivate or inactivate a bass module 32 and/or surround sound module 33. Here, when the system is cycled, e.g., powered down then powered up, the bass module 32 and surround sound module 33 may be activated by default, regardless whether these modules are inactivated at the user interface 402. The user interface screens 401, 402 generated by a customer device application permits a user to perform a night time mode operation which generates and outputs a control signal that includes the instruction to activate, reactivate, and/or inactivate a module such as the bass module 32 and/or surround sound module 33.

A number of implementations have been described. Nevertheless, it will be understood that the foregoing description is intended to illustrate and not to limit the scope of the inventive concepts which are defined by the scope of the claims. Other examples are within the scope of the following claims.

What is claimed is:

1. A method, comprising:
    configuring a first speaker module for communicating with at least one second speaker module;
    receiving, by a controller, an instruction to selectively activate, reactivate, or inactivate the at least one second speaker module with respect to the first speaker module;
    generating and outputting, by the first speaker module, a first range of sounds according to an audio output profile when the at least one second speaker module is activated;
    generating and outputting, by the at least one second speaker module, a complementary range of sounds that augment the first range of sounds when the at least one second speaker module is activated; and
    generating and outputting, by the first speaker module, a second range of sounds according to a different audio output profile when the at least one second speaker module is inactivated, the second range of sounds including a frequency of the complementary range of sounds.

2. The method of claim 1, further comprising constructing and arranging the first speaker module and the at least one second speaker module to receive audio signals from a multimedia electronic display or monitor.

3. The method of claim 1, wherein the at least one second speaker module includes at least one of a bass module or a surround sound module.

4. The method of claim 3, wherein when the bass module is activated, the first speaker module does not reproduce low frequency tones.

5. The method of claim 1, wherein the audio output profile corresponds to both the first speaker module and the at least one second speaker module, and wherein the different audio output profile corresponds to the first speaker module alone.

6. The method of claim 1, further comprising:
storing and executing an application at a customer electronic device; and
performing, by the application, a user-selectable night time mode operation which includes generating and outputting a control signal that includes the instruction to at least one of activate, reactivate, or inactivate the at least one second module.

7. A method, comprising:
generating and outputting, by a first sound box, a first range of sounds according to a first audio output profile;
generating and outputting, by at least one second sound box in communication with the first sound box, a second range of sounds that complements the first range of sounds;
receiving and processing, by a controller, an instruction from a remote electronic device to inactivate the second box;
generating and outputting, by the first sound box, a first range of sounds according to a second audio output profile different than the first audio output profile; and
generating and outputting, by the first sound box, a third range of sounds when the at least one second speaker module is inactivated, the third range of sounds including a frequency of the second range of sounds.

8. The method of claim 7, further comprising constructing and arranging the first sound box and the at least one second sound box to receive audio signals from a multimedia electronic display or monitor.

9. The method of claim 7, wherein the at least one second sound box includes at least one of a bass speaker or surround sound speakers.

10. The method of claim 9, wherein when the bass speaker is activated, the first sound box does not reproduce low frequency tones.

11. The method of claim 7, wherein the first audio output profile corresponds to both the first sound box and the at least one second sound box, and wherein the second audio output profile corresponds to the first sound box alone.

12. The method of claim 7, further comprising changing a system tuning parameter of the assembly when the at least one second sound box is shut off or inactivated.

13. The method of claim 7, further comprising:
wirelessly communicating, by the sound bar assembly, with a customer electronic device; and performing, by the customer electronic device, a user-selectable night time mode operation which generates and outputs a control signal that includes the instruction to at least one of activate, reactivate, or inactivate the at least one second sound box.

14. A computer program product comprising instructions stored in a non-transitory computer readable storage medium and which, when executed by one or more processors, cause the one or more processors to:
generate and output a control signal that includes an instruction to activate, reactivate, or inactivate at least one of a bass module or a surround sound module with respect to a sound bar module;
generate and output a first range of sounds when the at least one of the bass module or the surround sound module is activated;
augment the first range of sounds by the activation of the at least one of the bass module or the surround sound module and including a range of sounds output by the at least one of the bass module or the surround sound module;
generate and output a second range of sounds when the at least one of the bass module or the surround sound module is inactivated, the second range of sounds including a frequency of the range of sounds;
store and execute an audio output profile at one or more of the sound bar module, bass module, and surround sound module, the audio output profile controlling an audio output of the one or more of the sound bar module, bass module, and surround sound module; and
computer readable program code configured to generate the first range of sounds according to the audio output profile when the at least one of a bass module or the surround sound module is activated, and generate and output the second range of sounds according to a different audio output profile when the at least one of a bass module or the surround sound module is inactivated.

15. The computer program product of claim 14, wherein the audio output profile corresponds to both the sound bar module and at least one of the bass module or the surround sound module, and wherein the different audio output profile corresponds to the sound bar module alone.

16. The computer program product of claim 14, further comprising computer readable program code configured to perform a user-selectable night time mode operation which generates and outputs a control signal that includes the instruction to at least one of activate, reactivate, or inactivate the at least one of a bass module or the surround sound module.

17. The computer program product of claim 16, wherein the night time mode operation is performed to activate or inactivate according to a type of program content.

18. The computer program product of claim 16, further comprising computer readable program code configured to perform the user-selectable night time mode operation at a remote mobile electronic device.

* * * * *